| (12) | United States Patent | (10) Patent No.: US 11,021,002 B2 |
|---|---|---|
| | Okada et al. | (45) Date of Patent: Jun. 1, 2021 |

(54) NEAR INFRARED ABSORBING FINE PARTICLE DISPERSION LIQUID AND METHOD FOR PRODUCING THE SAME, ANTI-COUNTERFEIT INK COMPOSITION USING NEAR INFRARED ABSORBING FINE PARTICLE DISPERSION LIQUID, AND ANTI-COUNTERFEIT PRINTED MATTER USING NEAR INFRARED ABSORBING FINE PARTICLES

(71) Applicant: SUMITOMO METAL MINING CO., LTD., Tokyo (JP)

(72) Inventors: Mika Okada, Isa (JP); Hideaki Fukuyama, Isa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 16/394,342

(22) Filed: Apr. 25, 2019

(65) Prior Publication Data

US 2019/0263170 A1 Aug. 29, 2019

Related U.S. Application Data

(62) Division of application No. 15/546,755, filed as application No. PCT/JP2016/052400 on Jan. 27, 2016, now abandoned.

(30) Foreign Application Priority Data

Jan. 27, 2015 (JP) .................................. 2015-012897

(51) Int. Cl.
| | |
|---|---|
| *B42D 25/382* | (2014.01) |
| *B41M 3/14* | (2006.01) |
| *C09D 11/037* | (2014.01) |
| *C09D 11/50* | (2014.01) |
| *C09D 17/00* | (2006.01) |
| *C09K 3/00* | (2006.01) |
| *B42D 25/373* | (2014.01) |
| *B42D 25/387* | (2014.01) |

(52) U.S. Cl.
CPC ............ *B42D 25/382* (2014.10); *B41M 3/14* (2013.01); *C09D 11/037* (2013.01); *C09D 11/50* (2013.01); *C09D 17/00* (2013.01); *C09K 3/00* (2013.01); *B42D 25/373* (2014.10); *B42D 25/387* (2014.10)

(58) Field of Classification Search
CPC combination set(s) only.
See application file for complete search history.

(56) References Cited

U.S. PATENT DOCUMENTS

| 7,906,590 B2 * | 3/2011 | Lee ....................... B82Y 30/00 525/329.9 |
|---|---|---|
| 2005/0136243 A1 | 6/2005 | Fisher |
| 2008/0177003 A1 | 7/2008 | Lee et al. |
| 2008/0182930 A1 | 7/2008 | Adachi |
| 2008/0311308 A1 | 12/2008 | Lee et al. |

FOREIGN PATENT DOCUMENTS

| DE | 102008049595 A1 | 4/2010 |
|---|---|---|
| JP | H01-311177 A | 12/1989 |
| JP | H04-320466 A | 11/1992 |
| JP | H11-181336 A | 7/1999 |
| JP | 2000-096034 A | 4/2000 |
| JP | 2000-309736 A | 11/2000 |
| JP | 2004-168842 A | 6/2004 |
| JP | 2004168842 * | 6/2004 |
| JP | 2008-509271 A | 3/2008 |
| JP | 2008-169294 A | 7/2008 |
| JP | 2008-291167 A | 12/2008 |
| JP | 2009108324 A | 5/2009 |
| TW | 200846422 A | 12/2008 |
| WO | 2012103578 A1 | 8/2012 |

OTHER PUBLICATIONS

Apr. 26, 2016 International Search Report issued in International Patent Application No. PCT/JP2016/052400.
May 25, 2018 Extended European Search Report issued in European Patent Application No. 16743445.5.

\* cited by examiner

*Primary Examiner* — Monique R Peets
(74) *Attorney, Agent, or Firm* — Oliff PLC

(57) ABSTRACT

Provided are a near infrared absorbing fine particle dispersion liquid having an absorption ability in a near infrared region, a clear contrast, and applicable to offset printing, and a method for producing the same, an anti-counterfeit ink composition using the near infrared absorbing fine particle dispersion liquid and an anti-counterfeit printed matter using near infrared absorbing fine particles. Also provided are a near infrared absorbing fine particle dispersion liquid containing a solvent of one or more kinds selected from petroleum-based solvents; near infrared absorbing fine particles in an amount of 2 mass % or more and 25 mass % or less, selected from one or more kinds of hexaboride fine particles expressed by a general formula XBa, and a dispersant soluble in the solvent and having a fatty acid in its structure, and an anti-counterfeit ink composition containing the near infrared absorbing fine particle dispersion liquid.

18 Claims, 3 Drawing Sheets

NEAR INFRARED ABSORBING FINE PARTICLE DISPERSION LIQUID AND METHOD FOR PRODUCING THE SAME, ANTI-COUNTERFEIT INK COMPOSITION USING NEAR INFRARED ABSORBING FINE PARTICLE DISPERSION LIQUID, AND ANTI-COUNTERFEIT PRINTED MATTER USING NEAR INFRARED ABSORBING FINE PARTICLES

CROSS-REFERENCE TO RELATED APPLICATIONS

The present application is a divisional application of U.S. application Ser. No. 15/546,755 filed Jul. 27, 2017, which in turn is a U.S. national stage application of PCT/JP2016/052400 filed Jan. 27, 2016. Each of these prior applications is incorporated by reference herein in its entirety.

TECHNICAL FIELD

The present invention relates to a near infrared absorbing fine particle dispersion liquid having absorption ability in a near infrared region and applicable to offset printing and a method for producing the same, an anti-counterfeit ink composition using the near infrared absorbing fine particle dispersion liquid, and an anti-counterfeit printed matter using the near infrared absorbing fine particles.

DESCRIPTION OF RELATED ART

There are various kinds of printing technologies depending on the purpose and the like. Among them, offset printing enables high-precision printing and has characteristics that it is suitable for mass printing. In the offset printing, the following properties are required: a pigment dispersion liquid to be used based on its printing principle is lipophilic and does not dissolve a rubber blanket to which the dispersion liquid is transferred during the offset printing.

Meanwhile, in recent years, for example, for the purpose of prevention of counterfeiting and the like, the following matter is studied. Data is printed on various tickets, certificates and the like using a pigment using an infrared absorbing material, and the data is read by an infrared judging device or the like to thereby manage various information.

In such an application, a large amount of data is printed on a large amount of paper medium, and therefore use of the offset printing as a printing method has been studied.

Also, when an infrared absorbing material is transparent in a visible light region, it can not be distinguished visually that the infrared absorbing material is printed as a pigment. This is preferable from a viewpoint of prevention of counterfeiting and the like, and is also preferable from a viewpoint of visibility and a beautiful appearance because it does not visually obstruct an original print display.

As an example using the infrared absorbing material, patent document 1 proposes an anti-counterfeit printed matter using a phthalocyanine compound.

Further, patent document 2 proposes an anti-counterfeit printed matter using tin-doped indium oxide.

Meanwhile, inventors of the present invention disclose a coating solution for a selectively permeable membrane in which hexaboride fine particles are dispersed in an organic solvent, using the hexaboride fine particles expressed by a general formula $XB_6$ (wherein element X is at least one or more kinds selected from a group consisting of La, Ce, Pr, Nd, Gd, Tb, Dy, Ho, Y, Sm, Eu, Er, Tm, Yb, Lu, Sr, and Ca) as a material having high visible light transmittance and near infrared absorbing function, in patent document 3 and patent document 4. Further the inventors of the present invention disclose an anti-counterfeit ink in which an anti-counterfeit ink composition containing the hexaboride fine particles is dispersed in a solvent as a near infrared absorbing material having a high visible light transmittance and a near infrared absorbing function, in patent document 5.

[Patent Document 1] Japanese Patent Application Laid-Open Publication No. 1992-320466
[Patent Document 2] Japanese Patent Application Laid-Open Publication No. 2000-309736
[Patent Document 3] Japanese Patent Application Laid-Open Publication No. 1999-181336
[Patent Document 4] Japanese Patent Application Laid-Open Publication No. 2000-96034
[Patent Document 5] Japanese Patent Application Laid-Open Publication No. 2004-168842

SUMMARY OF THE INVENTION

Problem to be Solved by the Invention

According to studies by the inventors of the present invention, an organic pigment such as a phthalocyanine compound used in patent document 1 has a problem as follows. An infrared absorption property is changed due to an influence of temperature, ultraviolet rays or the like, and durability is inferior.

Further, the infrared absorbing material using tin-doped indium oxide, which is used in patent document 2, has insufficient contrast of a visible light that exists in a wavelength region for transmitting and reflecting the light, and an infrared light that exists in a wavelength region for absorbing the light. Therefore, when the near infrared absorbing fine particle dispersion liquid using the tin-doped indium oxide is applied to the offset printing, there is a problem that reading accuracy of a printing section and the like are deteriorated.

In contrast, in patent documents 3 to 5, the near infrared absorbing fine particles are dispersed in an organic solvent such as toluene. In a plate of offset printing, water repellency is utilized, and the plate is composed of a hydrophilic layer (non-image part) and a lipophilic layer (image part). The plate in which the near infrared absorbing fine particles are dispersed in an alcohol such as ethanol has a high polarity, and therefore when used for offset printing, there is a risk that the near infrared absorbing fine particles are attached to the non-image part of the plate. Therefore, such a plate cannot be used for the offset printing. Further, the plate in which the near infrared absorbing fine particles are dispersed in an organic solvent such as toluene has a possibility of dissolving a rubber blanket and can not be used for the offset printing.

Therefore, the inventors of the present invention attempt to obtain a dispersion liquid by using a petroleum-based solvent as a solvent, and adding hexaboride fine particles expressed by a general formula $XB_a$ (wherein X is an element of at least one or more kinds selected from La, Ce, Pr, Nd, Gd, Tb, Dy, Ho, Y, Sm, Eu, Er, Tm, Yb, Lu, Sr or Ca, satisfying $4.0 \leq a \leq 6.2$) to the solvent.

However, it is found that there is a problem that even if it is attempted to replace the organic solvent described in patent documents 3 to 5, with a petroleum-based solvent having low invasiveness to the resin, the force with which the petroleum-based solvent disperses the near infrared absorbing fine particles is inferior to organic solvents which are highly invasive to resins such as toluene, thus increasing a viscosity of the near infrared absorbing fine particle dispersion liquid. Then, as a result of increasing the viscosity of the near infrared absorbing fine particle dispersion liquid, there is a problem that the dispersed particle size of each near infrared absorbing fine particle can not be decreased to a predetermined value.

Under such a circumstance, the present invention is provided, and an object of the present invention is to provide a near infrared absorbing fine particle dispersion liquid having an absorption ability in a near infrared region, a clear contrast, and applicable to offset printing, and a method for producing the same.

Further, the present invention provides an anti-counterfeit ink composition containing the near infrared absorbing fine particle dispersion liquid enabling the offset printing. Further, an object of the present invention is to provide an anti-counterfeit printed matter which is impossible to be duplicated in copying and the like, and whose authenticity can be mechanically and reliably judged not depending on a visual judgment, having few restrictions in design, and excellent in anti-counterfeit effect, by using the anti-counterfeit ink composition containing the near infrared absorbing fine particle dispersion liquid.

Means for Solving the Problem

In order to solve the abovementioned problem, an intensive research is performed by the inventors of the present invention, and as a result, it is found that when one or more kinds selected from petroleum-based solvents are used as a solvent and hexaboride fine particles in an amount of 10 mass % or more and 25 mass % or less are added thereto, and pulverized and dispersed to thereby obtain a dispersion liquid, the hexaboride fine particles are sufficiently pulverized and dispersed when a viscosity of the dispersion liquid is 180 mPa/S or less, and a near infrared absorbing fine particle dispersion liquid applicable to offset printing can be obtained. It is also found that when pulverizing and dispersing the hexaboride fine particles, the viscosity of the dispersion liquid can be kept at 180 mPa/S or less by adding a predetermined dispersant to the dispersion liquid.

Further, the inventors of the present invention achieve an anti-counterfeit ink composition for offset printing containing a near infrared absorbing fine particle dispersion liquid as described above or containing a pigment commonly used in ordinary offset printing ink together with the abovementioned near infrared absorbing fine particle dispersion liquid, and an anti-counterfeit printed matter printed using the anti-counterfeit ink composition for offset printing. Thus, the present invention is completed.

Namely, in order to solve the abovementioned problem, a first invention is a near infrared absorbing fine particle dispersion liquid, containing:

a solvent of one or more kinds selected from petroleum-based solvents;

near infrared absorbing fine particles in an amount of 2 mass % or more and 25 mass % or less, selected from one or more kinds of hexaboride fine particles expressed by a general formula $XB_a$ (wherein element X is at least one or more kinds selected from a group consisting of La, Ce, Pr, Nd, Gd, Tb, Dy, Ho, Y, Sm, Eu, Er, Tm, Yb, Lu, Sr, and Ca, satisfying $4.0 \leq a \leq 6.2$); and a dispersant soluble in the solvent and having a fatty acid in its structure, wherein viscosity is 180 mPa/S or less.

A second invention is the near infrared absorbing fine particle dispersion liquid of the first invention, wherein the dispersant has one or more kinds selected from a secondary amine group, a tertiary amine group, and a quaternary ammonium group, as functional groups.

A third invention is the near infrared absorbing fine particle dispersion liquid of the first invention or the second invention, wherein the dispersant has an acid value of 1 mg KOH/g or more.

A fourth invention is the near infrared absorbing fine particle dispersion liquid of any one of the first to third inventions, wherein a dispersed particle size of each near infrared absorbing fine particle is 1 nm or more and 200 nm or less.

A fifth invention is the near infrared absorbing fine particle dispersion liquid of any one of the first to fourth inventions, wherein a surface of each near infrared absorbing fine particle is coated with a compound of one or more kinds selected from Si, Ti, Al, and Zr.

A sixth invention is the near infrared absorbing fine particle dispersion liquid of any one of the first to fifth inventions, wherein a lattice constant of the near infrared absorbing fine particle is 0.4100 nm or more and 0.4160 nm or less.

A seventh invention is the near infrared absorbing fine particle dispersion liquid of any one of the first to sixth inventions, wherein the solvent is one or more kinds selected from petroleum-based solvents having an aniline point of from 75° C. or more and 95° C. or less and a boiling point of from 150° C. or more and 340° C. or less.

An eighth invention is the near infrared absorbing fine particle dispersion liquid of any one of the first to seventh inventions, wherein the near infrared absorbing fine particle dispersion liquid further contains a binder.

A method for producing the near infrared absorbing fine particle dispersion liquid of any one of the first to eighth inventions, including:

mixing and dispersing the near infrared absorbing fine particles, the solvent, and the dispersant.

A tenth invention is an anti-counterfeit ink composition, containing the near infrared absorbing fine particle dispersion liquid of any one of the first to eighth inventions.

An eleventh invention is the anti-counterfeit ink composition of the tenth invention further containing a pigment.

A twelfth invention is the anti-counterfeit ink composition, wherein the pigment of the eleventh invention is an organic pigment and is one or more kinds selected from an azo lake pigment, an insoluble azo pigment, a condensed azo pigment, a phthalocyanine pigment, and a condensed polycyclic pigment.

A thirteenth invention is the anti-counterfeit ink composition, wherein the pigment of claim 11 is an inorganic pigment and is one or more kinds selected from carbon black, white pigment, an extender pigment, a red pigment, a yellow pigment, a green pigment, a blue pigment, a purple pigment, a fluorescent pigment, a temperature indicating pigment, a pearl pigment, and a metal powder pigment.

A fourteenth invention is the anti-counterfeit ink composition of any one of the tenth invention to thirteenth invention, containing one or more kinds selected from a plasticizer, an antioxidant, a thickener, and a wax.

A fifteenth invention is an anti-counterfeit printed matter having a printed pattern on one side or both sides of a base material, containing near infrared absorbing fine particles of one or more kinds of hexaboride fine particles expressed by a general formula $XB_a$ (wherein element X is at least one or more kinds selected from a group consisting of La, Ce, Pr, Nd, Gd, Tb, Dy, Ho, Y, Sm, Eu, Er, Tm, Yb, Lu, Sr, and Ca, satisfying $4.0 \leq a \leq 6.2$), in the printed pattern.

A sixteenth invention is an anti-counterfeit printed matter, wherein the printed pattern of the fifteenth invention further contains a pigment.

A seventeenth invention is an anti-counterfeit printed matter, wherein the pigment of the sixteenth invention is an inorganic pigment, and is one or more kinds selected from white pigment, an extender pigment, a red pigment, a yellow pigment, a green pigment, a blue pigment, a purple pigment, a fluorescent pigment, a temperature indicating pigment, a pearl pigment, and a metal powder pigment.

An eighteenth invention is an anti-counterfeit printed matter, wherein the pigment is an inorganic pigment and is one or more kinds selected from carbon black, white pigment, extender pigment, red pigment, yellow pigment, green pigment, blue pigment, violet pigment, fluorescent pigment, temperature indicating pigment, pearl pigment, and metal powder pigment.

A nineteenth invention is the anti-counterfeit printed matter of any one of the fifteenth to eighteenth inventions, wherein a value obtained by dividing an average value of a diffuse reflectance of the anti-counterfeit printed matter in a wavelength range of 800 nm to 1300 nm, by an average value of a diffuse reflectance of a blank not containing near infrared absorbing fine particles in a wavelength range of 800 nm to 1300 nm, is 0.84 or less.

Advantage of the Invention

By using the near infrared absorbing fine particle dispersion liquid of the present invention, it is possible to easily perform offset printing having an absorption ability in a near infrared region and a clear contrast. Further, by using the near infrared absorbing fine particle dispersion liquid of the present invention, it is possible to provide an anti-counterfeit ink composition enabling offset printing, and an anti-counterfeit printed matter which is impossible to be duplicated in copying and the like, and whose authenticity can be judged mechanically and reliably not depending on a visual judgment, having few restrictions in design, and excellent in anti-counterfeit effect.

DETAILED DESCRIPTION OF THE INVENTION

Figure 1:
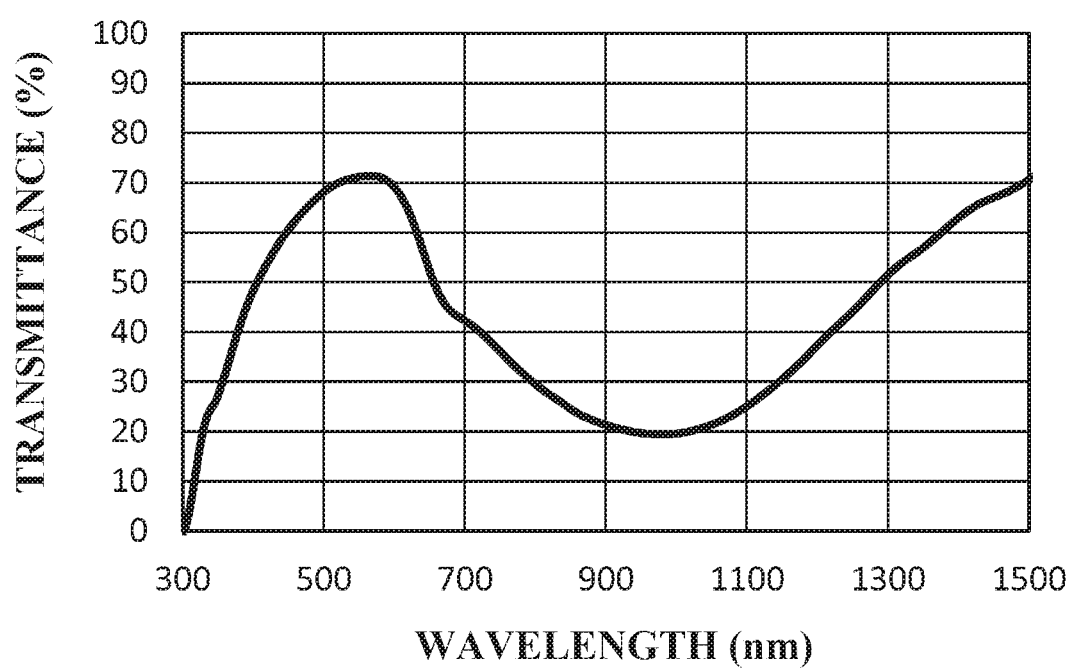
FIG. 1 is a light transmission profile of a dried film of a dispersion liquid A according to the present invention.

Embodiment of the present invention will be described in detail in an order of near infrared absorbing fine particles, a solvent, a dispersant, a method for dispersing near infrared absorbing fine particles in the solvent, a near infrared absorbing fine particle dispersion liquid, an anti-counterfeit ink composition for offset printing, a printing method, and an authenticity judging method.

1. Near Infrared Absorbing Fine Particles

The near infrared absorbing fine particles used in the present invention are hexaboride fine particles expressed by a general formula $XB_a$ ($4.0 \leq a \leq 6.2$). Wherein, element X is at least one or more kinds selected from La, Ce, Pr, Nd, Tb, Dy, Ho, Y, Sm, Eu, Er, Tm, Yb, Lu, Sr and Ca.

Specifically, it is preferable to use one or more kinds selected from lanthanum hexaboride $LaB_6$, cerium hexaboride $CeB_6$, praseodymium hexaboride $PrB_6$, neodymium hexaboride $NdB_6$, hexadentate gadolinium $GdB_6$, terbium hexaboride $TbB_6$, dysprosium hexaboride $DyB_6$, holmium hexaboride $HoB_6$, yttrium hexaboride $YB_6$, samarium hexaboride $SmB_6$, europium hexaboride $EuB_6$, erbium hexaboride $ErB_6$, thulium hexaboride $TmB_6$, ytterbium hexaboride $YbB_6$, lutetium hexaboride $LuB_6$, lanthanum hexaboride cerium $(La, Ce)B_6$, strontium hexaboride $SrB_6$, and calcium hexaboride $CaB_6$.

It is preferable that a surface of each hexaboride fine particle is not oxidized. However, its surface is usually slightly oxidized in many cases, and it is inevitable to some extent that oxidation occurs on the surface in a fine particle dispersing step. Even in that case, there is no change in effectiveness of developing a heat ray shielding effect, and accordingly it is possible to use even the hexaboride fine particle whose surface is oxidized.

Further, the abovementioned hexaboride fine particles have a higher heat ray shielding effect as crystallinity becomes higher. Even if the hexaboride fine particles have low crystallinity and produce broad diffraction peaks by X-ray diffraction, a desired heat ray shielding effect can be exhibited when a basic bond inside the fine particle is composed of a bond between each metal and boron and a lattice constant is 0.4100 nm or more and 0.4160 nm or less, and therefore the hexaboride fine particles can be preferably used in the present invention. The lattice constant can be obtained by conducting a Rietveld analysis based on data of an XRD pattern, for example.

It is also preferable that the surface of the hexaboride fine particle is coated with a silane coupling agent. Since the surface of hexaboride fine particle is coated with a silane coupling agent, excellent dispersibility of hexaboride fine particles can be obtained. This is because in the near infrared absorbing fine particle dispersion liquid of the present invention, excellent near infrared absorbing function and transparency in the visible light region can be obtained as a result of the excellent dispersibility.

In a film in which the hexaboride fine particles of the present invention are sufficiently finely and uniformly dispersed, it is observed that a light transmittance has a maximum value between wavelengths 400 nm and 700 nm and has a minimum value between wavelengths 700 nm and 1800 nm, and further a difference between the maximum value and the minimum value in the transmittance of the light is 15 points or more.

A wavelength of a visible light is 380 nm to 780 nm and a human visibility takes a bell-type form with its peak at around 550 nm wavelength. When this is taken into consideration, it is found that such a heat ray shielding transparent resin molded product effectively transmits visible lights and effectively reflects and absorbs other heat rays.

The hexaboride fine particles of the present invention largely absorb a light in a near ultraviolet region near a wavelength range of 350 to 400 nm and in the near infrared region near a wavelength range of 650 to 1300 nm, and particularly a light near a wavelength of 1000 nm. Therefore, a transmission color tone is from colorless to greenish in many cases.

Further, the dispersed particle size of each hexaboride fine particle of the present invention can be selected according to the intended use. For example, in order for the hexaboride fine particles of the present invention to exhibit absorption in the near infrared region, a dispersed particle size of each hexaboride fine particle is sufficiently decreased. This is because an absorption property of hexaboride is caused by localized surface plasmon resonance which is a phenomenon peculiar to nanoparticles. Here, the dispersed particle size means an aggregated particle size of boride fine particles in a solvent, and it can be measured with various commercially available particle size distribution meters. For example, sampling is performed from a dispersion liquid in which boride fine particles are dispersed in a solvent, with aggregates of boride fine particles also present therein, so that the dispersed particle size can be measured using ELS-800 manufactured by Otsuka Electronics Co., Ltd. based on a principle of dynamic light scattering method.

When the dispersed particle size of the hexaboride fine particles exceeds, for example, 1500 nm, the hexaboride fine particles have almost no absorption in the near infrared region. In contrast, when the dispersed particle size of the hexaboride fine particles is about 800 nm or less, the absorption in the near infrared region becomes strong, and when it is 200 nm or less, stronger absorption is exhibited, and when it is 100 nm or less, further stronger absorption is exhibited.

On the other hand, in the hexaboride fine particles of the present invention, transparency/non-scattering property in the visible light region can be obtained by suppressing a light scattering caused by the fine particles. As the light scattering, there are geometric optical scattering, Mie scattering, and Rayleigh scattering, depending on the ratio of the particle size to a light wavelength.

In a case of the visible light, geometric optical scattering can be almost ignored as long as the dispersed particle size of each hexaboride fine particle is 1000 nm or less. Then, when the dispersed particle size is 200 nm or less, Mie scattering is weakened, and when it is 100 nm or less, further weakening is achieved. Rayleigh scattering is a main scattering factor in a region where the dispersed particle size of the fine particle is further smaller. Then, Rayleigh scattering intensity is decreased in inverse proportion to sixth power of the dispersed particle size, and therefore the scattering light can be reduced by further decreasing the dispersed particle size of the fine particles, and this is preferable.

The hexaboride fine particle dispersion liquid of the present invention is used as a raw material for anti-counterfeit ink for offset printing, and when this is further taken into consideration in view of the above matter, the dispersed particle size of the hexaboride fine particle of the present invention is preferably 200 nm or less. This is because when the dispersed particle size is 200 nm or less, near infrared absorption of hexaboride by localized surface plasmon resonance is sufficiently exhibited and light scattering of the visible light is sufficiently reduced, and therefore the contrast of [reflection/absorption] or [transmission/absorption] of the light reflected by the surface of the printed matter or the light transmitted through the printed matter, is improved. On the other hand, when the dispersed particle size is 1 nm or more, industrial production is easy.

It is preferable that the surface of the hexaboride fine particle of the present invention is coated with an oxide containing at least one or more kinds of Si, Ti, Zr and Al, from a viewpoint of improving a weather resistance of the hexaboride fine particles.

2. Solvent

The solvent used in the present invention is required to be water-insoluble and not to dissolve a rubber roller, etc. Specifically, a solvent of one or more kinds selected from petroleum-based solvents can be used.

The petroleum-based solvent is preferably a solvent derived from a crude oil having an aromatic hydrocarbon content of 5% by weight or less, and having a boiling point in a range of from 50° C. to 350° C., preferably from 150° C. to 340° C. When the boiling point of the petroleum-based solvent is 50° C. or more, handling is easy because a volatilization amount of the solvent during pulverizing and dispersing treatment performed to hexaboride particles is not excessive. Further, when the boiling point of the petroleum-based solvent is 350° C. or less, this is preferable because such a petroleum-based solvent has a sufficient drying property.

The aniline point of the petroleum-based solvent is preferably in a range of 70° C. or more and 95° C. or less. When the aniline point is 70° C. or more, the ability to dissolve resin does not become excessive, and even when a base material is an acrylic resin or the like, the petroleum-based solvent can be used. Also, the petroleum-based solvent can be used in printing processes using rubber jigs like offset printing. When the aniline point is 95° C. or less, the petroleum-based solvent has a sufficient resin solubility, which is preferable, because the dispersant can be used, for example, even in a case of a solid state.

As a specific example of preferable petroleum-based solvents, Isoper E, Exxol Hexane, Exol Heptane, Exol E, Exol D 30, Exol D 40, Exol D 60, Exol D 80, Exxol D 95, Exol D 110, Exol D 130 (all of them are manufactured by Exxon Mobil Corporation), and the like, can be cited, as commercially available petroleum-based solvents.

3. Dispersant

The dispersant for dispersing the near infrared absorbing fine particles in the solvent, which has a structure of a fatty acid, is preferable. Further, the dispersant is required to be soluble in the solvent of the present invention described above.

Further, the structure of the dispersant is not particularly limited, but it is preferable to use a polymer dispersant having a basic anchor portion. The anchor portion is a part (group) in the molecule of the polymer dispersant and is a part (group) that is adsorbed on the surface of the near infrared absorbing fine particle.

In the present invention, when the polymer dispersant having particularly the basic anchor portion is used, storage stability of the ink is improved, which is preferable. As a basic part (group) serving as the anchor portion, there are parts (groups) such as a secondary amino group, a tertiary amino group, and a quaternary ammonium group.

Figure 2:
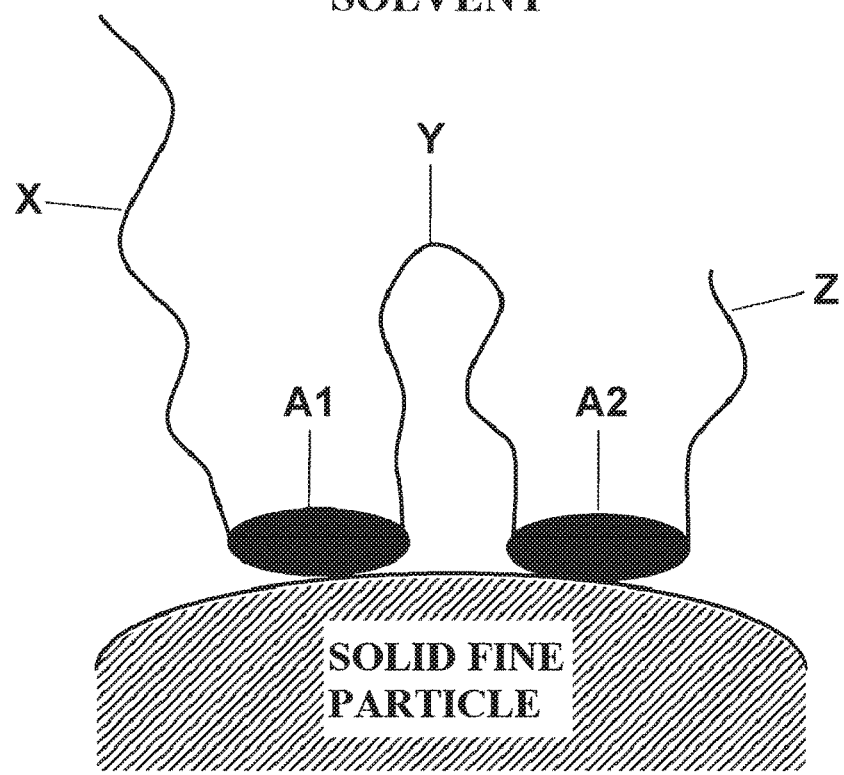
FIG. 2 is a schematic view of an aspect of a polymer dispersant used in the present invention.

An aspect of the polymer dispersant used in the present invention is shown in FIG. 2. In the general formula [X-A1-Y-A 2-Z], A1 and A2 are portions (anchor portions) which are adsorbed on solid fine particles. In the anchor portion, its structure is not particularly limited as long as it has at least one point (adsorption point) to be adsorbed on each solid fine particle, and has a chain, cyclic, or fused polycyclic shape, or a combination thereof for example. Further, A1 and A2 may be the same or different. On the other hand, X, Y and Z are polymer chain portions which are solvated, and solved and spread out from the surface of the solid fine particle into a liquid, and hereinafter, X and Z are referred to as tail portions and Y is referred to as a loop portion. In the tail portions and the loop portion, a homopolymer composed of a single monomer and a copolymer composed of plural monomers are used.

Further, as the polymer dispersant used in the present invention, a substance having no loop portion (Y) in the general formula [X-A1-Y-A2-Z], can be used, which is synonymous with the general formula [X-A1-A2-Z].

Figure 3:
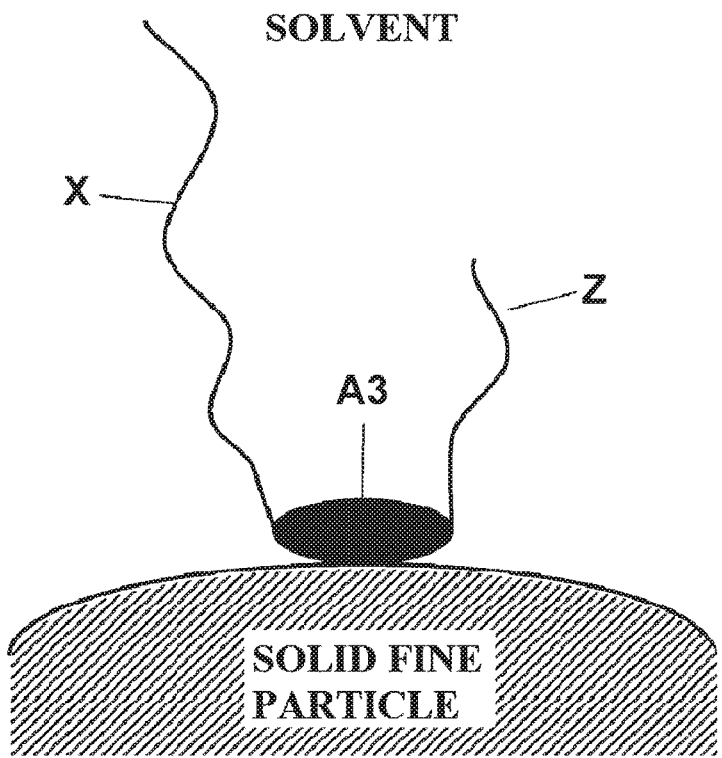
FIG. 3 is a schematic view of an aspect of another different polymer dispersant used in the present invention.

Still further, as an aspect of the polymer dispersant used in the present invention, there is also a structure in which Y shown in FIG. 3 does not exist and two tail portions are bonded to one anchor portion. In this case, the general formula is [X-A3-Z].

Figure 4:
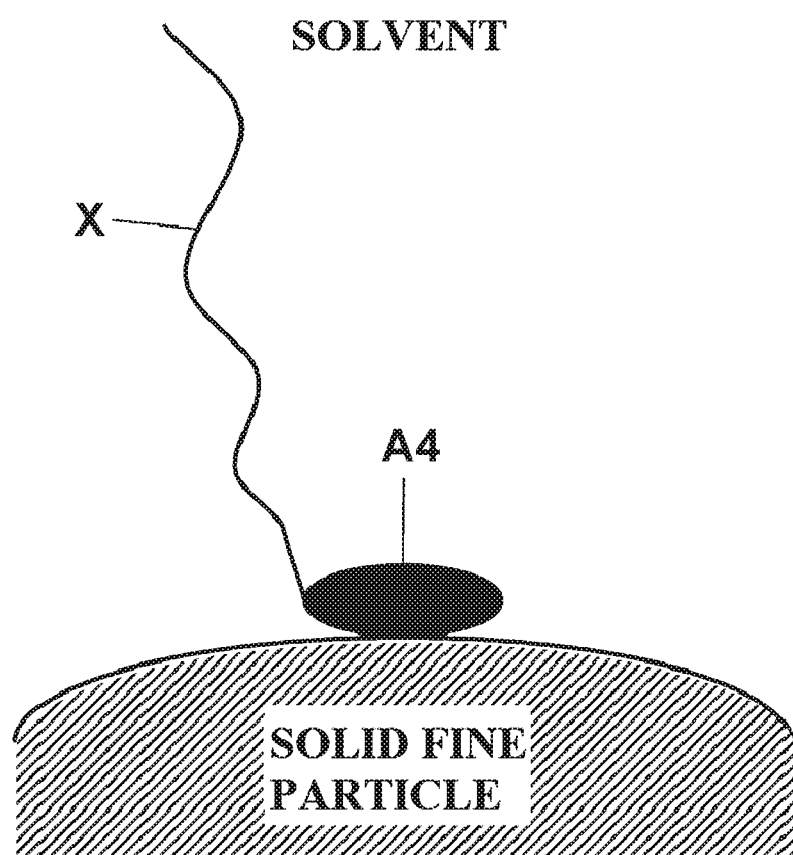
FIG. 4 is a schematic view of an aspect of a further another different polymer dispersant used in the present invention.

In addition, as an aspect of the polymer dispersant used in the present invention, there is also a structure in which Z shown in FIG. 4 does not exist and one tail portion is bonded to one anchor portion. In this case, the general formula is [X-A4].

"A" constituting the polymer dispersant used in the present invention (in the present invention, A1, A2, A3, and A4 described above may be collectively referred to as "A" in some cases), has for example at least one adsorption point (functional group) having an adsorption interaction with the surface of the solid particle by hydrogen bonding or an acid-base interaction or the like. Further, although A1 and A2 may be the same or different, A1 and A2 preferably have the same functional group as the functional group having the adsorption interaction at the adsorption point, in consideration of adsorptivity to the solid fine particles.

X, Y and Z constituting the polymer dispersant used in the present invention may be composed of different chemical species, and at least two of them may be composed of the same chemical species. Since the tail portions and the loop portion are solvated portions which are solved and spread out from the surface of the solid fine particle into the liquid, the polymer chain having affinity with the solvent for dispersing the abovementioned solid fine particles is used.

Further, when the acid value of the dispersant of the present invention is 1 mg KOH/g or more, the near infrared absorbing fine particle dispersion liquid of the present invention has a high ability of dispersing the abovementioned infrared absorbing fine particles in the solvent, which is preferable.

When 2 mass % or more and 25 mass % or less of hexaboride of the present invention is added to the solvent of one or more kinds selected from the petroleum-based solvents of the present invention, and the dispersant of the present invention is added thereto, and a mechanical dispersing operation is performed, the obtained dispersion liquid is preferable because there is no risk of dissolving the rubber roller or the like of an offset printing machine.

In a case of a commercially available dispersant as a specific example of a preferable dispersant, DISPERBYK 142; Disperbyk 160, Disperbyk 161, Disperbyk 162, Disperbyk 163, Disperbyk 166, Disperbyk 170, Disperbyk 180, Disperbyk 182, Disperbyk 184, Disperbyk 190, Disperbyk 2155 (All manufactured by BYK Japan K.K.); EFKA-46, EFKA-47, EFKA-48, EFKA-49 (all manufactured by BASF); SOLSPERSE 11200, Solsperse 13940, Solsperse 16000, Solsperse 17000, Solsperse 18000, Solsperse 20000, Solsperse 24000, Solsperse 27000, Solsperse 28000, Solsperse 32000, Solsperse 33000, Solsperse 39000, Solsperse 56000, Solsperse 71000 (manufactured by Lubrizol Japan); SOLPLUS Solplus D 530, Solplus DP 320, Solplus L 300, Solplus K 500, Solplus R 700 (all manufactured by Lubrizol Japan); Ajisper PB 711, Ajisper PA 111, Ajisper PB 811, Ajisper PW 911 (manufactured by Ajinomoto Co., Ltd.); Florel DOPA-15B, Floren DOPA-22, Floren DOPA-17, Floren TG-730W, Floren G-700, Floren TG-720W (all manufactured by Kyoeisha Chemical Industry Co., Ltd.), etc., can be mentioned.

An addition amount of the dispersant of the present invention is preferably 30 parts by weight or more and 200 parts by weight or less based on 100 parts by weight of hexaboride fine particles.

When a commercially available dispersant is used, it is preferable that the dispersant does not contain a solvent that may possibly dissolve the rubber blanket for offset printing. Accordingly, a nonvolatile content (after heating at 180° C. for 20 minutes) of the dispersant is preferably high, for example, preferably 95% or more.

4. Method for Dispersing the Near Infrared Absorbing Fine Particles in the solvent The method for dispersing the near infrared absorbing fine particles of the present invention in the solvent to thereby obtain the near infrared absorbing fine particle dispersion liquid, can be arbitrarily selected as long as the fine particles are uniformly dispersed in the solvent. Specifically, it is preferable to use a wet medium mill such as a bead mill or a ball mill.

In the near infrared absorbing fine particle dispersion liquid of the present invention, a concentration of the hexaboride fine particles is 2 to 25 mass %, preferably 5 to 25 mass %, and more preferably 10 to 25 mass %.

The higher the concentration of the hexaboride fine particles is, the easier it is to prepare the anti-counterfeit ink for offset printing, which is preferable. In contrast, when the concentration of the hexaboride fine particles is 25 mass % or less, the viscosity of the obtained near infrared absorbing fine particle dispersion liquid can be suppressed to 180 mPa/S or less by adding the abovementioned dispersant, and the hexaboride particles can be sufficiently pulverized and dispersed. In this case, the dispersed particle size of the hexaboride fine particle can be arbitrarily controlled depending on the treatment time using the wet medium mill. By increasing the treatment time, the dispersed particle size can be suppressed to be small.

5. Near Infrared Absorbing Fine Particle Dispersion Liquid

By the producing method described above, the near infrared absorbing fine particle dispersion liquid of the present invention can be obtained.

A binder may be further added to the near infrared absorbing fine particle dispersion liquid of the present invention. The binder is not particularly limited as long as it soluble in the solvent of the present invention, and for example, synthetic resins such as rosin-modified phenol resin, rosin-modified alkyd resin and petroleum resin-modified phenolic resin, can be mentioned. Therefore, the binder suitable for the purpose can be selected.

6. Anti-Counterfeit Ink Composition for Offset Printing

The anti-counterfeit ink composition for offset printing can be obtained by mixing the near infrared absorbing fine particle dispersion liquid of the present invention, a resin varnish component, a vegetable oil component, a petroleum-based solvent component, and an additive agent.

As the resin varnish component, arbitrary resin system such as phenol resin, petroleum resin, rosin modified phenol resin, petroleum resin modified rosin modified phenol resin, vegetable oil modified rosin modified phenol resin, modified alkyd resin, rosin modified maleic acid resin, polyester resin, acrylic resin, urethane resin, and epoxy resin, etc., are preferably used, and for example, a resin varnish using rosin modified phenol resin or petroleum resin is preferably used.

An addition amount of the resin varnish in the lithographic offset printing ink composition is 15 to 70 mass %, preferably 40 to 60 mass %. Further, as the vegetable oil component and the petroleum-based solvent component, any one of those generally used for the lithographic offset ink may be used.

Plasticizers, oxidant inhibitors, thickeners, waxes and the like can be mentioned as the additive agent.

Further, in the anti-counterfeit ink composition for offset printing of the present invention, it is possible to form a colored pattern in the visible light region by adding a pigment used for a general lithographic offset ink. By forming the colored pattern, an effect in terms of a design can be enhanced, and an anti-counterfeit effect can be enhanced.

As the abovementioned pigment, any pigment may be used as long as it does not impair printing suitability. Specifically, various organic pigments such as azo lake pigment, insoluble azo pigment, condensed azo pigment, phthalocyanine pigment, condensed polycyclic pigment and the like can be used. In addition to the organic pigment, various inorganic pigment including white pigments such as titanium oxide and white lead, extender pigments such as calcium carbonate, red pigments such as red iron oxide, yellow pigments such as yellow lead, green pigments such as chromium oxide, blue pigments such as ultramarine, purple pigment such as manganese violet, and fluorescent pigment, temperature-indicating pigment, pearl pigment, metal powder pigment and the like, can be used.

Further, it is also preferable to use carbon black alone.

In the anti-counterfeit ink composition for offset printing of the present invention, as described above, it is possible to simultaneously use the near infrared absorbing fine particles and the pigment used for a general lithographic offset ink. By adopting such a configuration, a color difference from ordinary offset ink not containing the near infrared absorbing fine particles, can be small enough so that it cannot be visually discriminated.

The near infrared absorbing fine particle dispersion liquid, the resin varnish component, the petroleum solvent component, the additive, and/or the pigment of the present invention can be kneaded using a kneading machine such as a triple roll mill and the like. At that time, wetting varnishes such as alkyd resin and other additives that are excellent in wetting properties of an infrared absorbing agent may be used in order to increase the degree of kneading and to improve working efficiency.

7. Printing Method

As a printing method for providing the printed matter of the present invention, a conventionally known lithographic offset printing method is used. For example, offset sheet-fed printing, offset rotary printing, waterless offset printing, dry offset printing, and the like can be mentioned.

As a base material used in the printed matter of the present invention, for example, white paper, a plastic film printed in white, and the like can be mentioned. As the plastic film in this case, polypropylene (PP), polyvinyl chloride (PVC), polyethylene terephthalate (PET), synthetic paper and the like can be mentioned. Depending on the purpose of use of the finished product, it is considered that there is a superiority of paper and film respectively, although it cannot be said which is good unconditionally. However, in the example of the present invention described later, white pure paper is chosen because of inexpensiveness and ease of handling.

As an anti-counterfeit ink set for offset printing of the present invention, conventionally known lithographic offset printing ink is used. For example, oxidation polymerization type ink, heat set type ink, osmotic drying type ink and the like can be mentioned.

Further, conventionally known plate making technology is also used for a plate used for printing.

For example, a plate formed by amplitude modulation screening (AM screening) method, a plate formed by frequency modulation screening (FM screening) method, and the like can be mentioned.

By printing using the anti-counterfeit ink composition for offset printing of the present invention, a printed matter which is less restricted in design and also excellent in the anti-counterfeit effect can be provided.

8. Authenticity Judging Method

The printed matter of the present invention is irradiated with the near infrared rays having a wavelength of 800 nm to 1300 nm, and the near infrared rays having the abovementioned wavelength diffusely reflected from the printed matter are measured. The printed matter of the present invention has less diffuse reflection of near infrared rays having a wavelength of 800 nm to 1300 nm as compared with a blank printed matter not containing the near infrared absorbing fine particles. Therefore, based on a difference between a diffuse reflectance of the printed matter containing the near infrared absorbing fine particles for reflecting the near infrared ray having a wavelength of 800 nm to 1300 nm, and a diffuse reflectance of the blank printed matter for reflecting the near infrared ray having a wavelength of 800 nm to 1300 nm, the authenticity of the printed matter can be easily judged. For example, by dividing a diffuse reflectance value of the printed matter of the present invention in a wavelength range of 800 nm to 1300 nm, by a diffuse reflectance value of the blank printed matter in a wavelength range of 800 nm to 1300 nm, it is possible to evaluate a net diffuse reflectance of the near infrared absorbing fine particles excluding factors such as the binder and other factors and the base material. The smaller this divided value is, the easier the authenticity is judged, and 0.84 or less is preferable, 0.77 or less is more preferable.

In order to decrease the value obtained by dividing the diffuse reflectance value of the printed matter containing the near infrared absorbing fine particles, by the diffuse reflectance value of the blank printed matter, it can be considered that the content of the near infrared absorbing fine particles may be increased, and the concentration of the near infrared absorbing fine particles in the ink may be increased. However, there is a limit in terms of ink stability and cost. In addition, it can be considered that a film thickness is thickened by overcoating the ink. However, there is a concern that influences such as an increase in man-hours and unevenness on a printed surface due to thickening of the film thickness, etc. are caused.

Accordingly, it is preferable that an amount of the near infrared absorbing fine particles contained in the printed matter is small, thus leading to use of the near infrared absorbing fine particles of the present invention. Specifically, the amount of the near infrared absorbing fine particles contained in the printed matter is preferably 0.8 $g/cm^2$ or less.

The diffuse reflectance of the present invention is obtained by measuring a relative value of the diffuse reflectance in a wavelength region of 800 nm to 1300 nm, with respect to the diffuse reflectance of a white plate formed by solidifying barium sulfate fine powder, which is adjusted to 100% using a spectrophotometer.

EXAMPLES

The present invention will be specifically described hereafter with reference to examples, but the present invention is not limited to these examples.

A method for measuring the acid value of the near infrared absorbing fine particle dispersant of this example complies with JIS K 0070, and performed by a potentiometric titration method. Further, the optical properties of the printed matter of the example were measured using a spectrophotometer U-4100 (manufactured by Hitachi, Ltd.).

Further, measurement was performed under a condition of using CuKα ray using an X-ray diffractometer (D2 PHASER manufactured by Bruker AXS Co., Ltd.) to thereby obtain an XRD pattern of 2θ=10° to 100°, and Rietveld analysis was performed based on the XRD pattern, to thereby obtain a lattice constant of the near infrared absorbing fine particles of this example.

Then, optical properties of the printed matter of this example were measured using a spectrophotometer U-4100 (manufactured by Hitachi, Ltd.). The diffuse reflectance was measured as follows: a spectrophotometer U-4100 (manufactured by Hitachi, Ltd.) was prepared so that the diffuse reflectance of a white board on which fine powder of barium sulfate has been hardened was adjusted to 100%, and the diffuse reflectance was measured as a relative value of every 5 nm in a wavelength region of 800 nm to 1300 nm, and an average value of the obtained values was used.

Example 1

10.0 mass % of lanthanum hexaboride fine particles (average particle size: 1 to 2 μm) as near infrared absorbing fine particles, 5.0 mass % of a dispersant (abbreviated as dispersant a hereafter) having a fatty acid in its structure, having an amino group, having an acid value of 20.3 mg KOH/g, having a hydroxystearic acid chain, and having a nonvolatile content of 100%, and 85.0 mass % of Exxsol D80 (boiling point 205° C., aniline point 79° C.) as a solvent, were weighed.

These near infrared absorbing fine particles, dispersant, and solvent were charged in a paint shaker containing 0.3 mmϕ $ZrO_2$ beads, pulverized and dispersed for 30 hours, to thereby obtain the near infrared absorbing fine particle dispersion liquid (abbreviated as dispersion liquid A hereafter) of example 1.

When the dispersed particle size of each hexaboride fine particle in the dispersion liquid A was measured using a particle size distribution meter (manufactured by Otsuka Electronics Co., Ltd.), it was found to be 79.3 nm. Further, the lattice constant of the lanthanum hexaboride fine particles was 0.41560 nm.

An acrylic resin base material having a thickness of 3 mm was prepared as a base material to be printed and a dispersion liquid A was formed on the surface thereof using a bar coater to a thickness of 8 μm. This film was dried at 70° C. for 1 minute to dry the dispersion liquid A to thereby obtain a dried film.

The visible light transmittance of the obtained dried film of the dispersion liquid A was 69.1%. Further, the transmittance of a light having a wavelength of 550 nm in a visible light region was 71.2%, the transmittance of a light having a wavelength of 800 nm was 29.5%, the transmittance of a light having a wavelength of 900 nm was 21.3%, the transmittance of a light having a wavelength of 1000 nm was 19.6%, and the transmittance of a light having a wavelength of 1500 nm was 70.6% in a near infrared region. The light transmission profile of the dried film of this dispersion liquid A is shown in FIG. 1 and the measurement results are shown in table 1 (the same thing can be applied to comparative examples 1 and 2).

In the dispersion liquid A, the solubility of the contained solvent is low, and since the solvent is low in polarity and does not mix with water, it can be applied to the offset printing.

Comparative Example 1

10.0% mass % of lanthanum hexaboride fine particles (average particle size: 1 to 2 μm) as the near infrared absorbing fine particles, 8.0 mass % of an acrylic dispersant (abbreviated as dispersant d hereafter) having a carboxyl group as a functional group, and 82.0 mass % of toluene (boiling point: 110° C., aniline point: 10° C.) as a solvent were mixed, and pulverized/dispersed for 30 hours by a paint shaker containing 0.3 mmϕ $ZrO_2$ beads, to thereby prepare a hexaboride fine particle dispersion liquid (abbreviated as dispersion liquid B).

When the dispersed particle size of each hexaboride fine particle in the dispersion liquid B was measured using a particle size distribution meter (manufactured by Otsuka Electronics Co., Ltd.), it was found to be 82.6 nm. Further, the lattice constant was 0.41560 nm.

However, in the dispersion liquid B, the solubility of the solvent contained therein was high, and it was impossible to apply it for the offset printing.

Comparative Example 2

10.0 mass % of lanthanum hexaboride fine particles (average particle size: 1 to 2 μm) as the near infrared absorbing fine particles, 8.0 mass % of dispersant a, and 82.0 mass % of isopropyl alcohol were weighed.

These near infrared absorbing fine particles, dispersant, and solvent were pulverized and dispersed for 30 hours using a paint shaker containing 0.3 mmϕ $ZrO_2$ beads, to thereby obtain an infrared absorbing fine particle dispersion liquid of comparative example 2.

When the dispersed particle size of each hexaboride fine particle in the dispersion liquid C was measured using a particle size distribution meter (manufactured by Otsuka Electronics Co., Ltd.), it was found to be 80.1 nm. Further, the lattice constant was 0.41560 nm.

However, polarity of the solvent contained in the dispersion liquid C was high and the dispersion liquid C was mixed with water, and therefore it could not be applied to the offset printing.

Example 2

Explanation will be given for a preparation example of anti-counterfeit ink A (abbreviated as an ink A hereafter) for offset printing using the dispersion liquid A, and an example of printing using the ink A. However, the range of the present invention is not limited to these examples.

(Preparation of Rosin-Modified Phenolic Resin)

1000 parts by weight of P-octylphenol, 850 parts by weight of 35% formalin, 60 parts by weight of 93% sodium hydroxide, and 1000 parts by weight of toluene, were charged in a four-necked flask equipped with a stirrer, a condenser, and a thermometer. Then, a mixture was allowed to react at 90° C. for 6 hours. Thereafter, a hydrochloric acid solution of 125 parts by weight of 6N hydrochloric acid and 1000 parts by weight of water was added, and after being stirred and left to stand, an upper layer part was taken out. Then, 2000 parts by weight of a toluene solution of a resol type phenol resin having a 49% nonvolatile content was obtained, which was used as a resol liquid.

1000 parts by weight of gum rosin was charged in a four-necked flask equipped with a stirrer, a cooler with a moisture separator, and a thermometer, and dissolved at 200° C. while blowing a nitrogen gas therein. 1,800 parts by weight of the resol liquid obtained above was added thereto, and the mixture was allowed to react at 230° C. for 4 hours while removing toluene. After the reaction, 110 parts by weight of glycerin was added and reacted at 250° C. for 10 hours so that the acid value was adjusted to 20 mg KOH/g or less, to thereby obtain a rosin-modified phenol resin having a weight average molecular weight of 50000, an opaque temperature of 88° C. in AF Solvent No. 6 produced by Nippon Petrochemical Co., Ltd.

(Preparation of Varnish)

40 parts by weight of the rosin-modified phenol resin, 35 parts by weight of soybean oil, 24 parts by weight of AF Solvent No. 6 (solvent manufactured by Nippon Petrochemical Co., Ltd.), 1.0 part by weight of ALCH (gelling agent manufactured by Kawaken Fine Chemicals Co., Ltd.) were heated and stirred at 190° C. for 1 hour, to thereby obtain a varnish.

(Preparation of Anti-Counterfeit Ink for Offset Printing)

In a formulation shown in table 2, the dispersion liquid A prepared in example 1, a varnish, a petroleum-based solvent (AF-6 Solvent manufactured by Nippon Oil Corporation), soybean oil, tung oil, compound (manufactured by GODO Ink: UG compound), a metal drier (937 dryer manufactured by DIC Graphics Co., Ltd.), and a drying inhibitor (INKEEPER manufactured by Tokyo Ink Co., Ltd.) were mixed, to thereby obtain an ink A. The concentration of lanthanum hexaboride in the ink A was 0.38 mass %. The obtained offset printing ink did not cause agglomeration or the like and was stable.

(Preparation of the Printed Matter)

White fine high quality paper was prepared as a base material to be printed and offset printing was performed using the ink A, to thereby obtain a printed matter A. An average value of the diffuse reflectance of the obtained printed matter A in the wavelength range of 800 nm to 1300 nm was 61.9%.

In contrast, the average value of the diffuse reflectance of the blank printed matter of comparative example 3 described later in a wavelength range of 800 nm to 1300 nm was 77.7%.

Accordingly, a value obtained by dividing the average value of the diffuse reflectance of the printed matter A of example 2 in the wavelength range of 800 nm to 1300 nm, by the average value of the diffuse reflectance of the blank printed matter of comparative example 3 in the wavelength range of 800 nm to 1300 nm described later was 0 80.

Example 3

In the same manner as in example 2 except that the dispersion liquid A, the varnish, the petroleum-based solvent, the soybean oil, the tung oil, the compound, the metal drier, and the drying inhibitor prepared in example 1 were mixed in the formulation shown in table 2, an anti-counterfeit ink B (abbreviated as an ink B hereafter) for offset printing was obtained. The concentration of lanthanum hexaboride in the ink B was 0.75 mass %. White fine high quality paper was prepared as the base material to be printed and offset printing was performed using the ink B, to thereby obtain a printed matter B. The average value of the diffuse reflectance of the obtained printed matter B in the wavelength range of 800 nm to 1300 nm was 49.4%.

Accordingly, the value obtained by dividing the average value of the diffuse reflectance of the printed matter B in the wavelength range of 800 nm to 1300 nm, by the average value of the diffuse reflectance of the blank printed matter of the comparative example 3 in the wavelength range of 800 nm to 1300 nm was 0.64.

Example 4

In the same manner as in example 2 except that the dispersion liquid A, the varnish, the petroleum-based solvent, the soybean oil, the tung oil, the compound, the metal drier, and the drying inhibitor prepared in example 1 were mixed in the formulation shown in table 2, an anti-counterfeit ink C (abbreviated as an ink C hereafter) for offset printing was obtained. The concentration of lanthanum hexaboride in the ink C was 1.88 mass %. White fine high quality paper was prepared as the base material to be printed, and offset printing was performed using the ink C, to thereby obtain a printed matter C. The average value of the diffuse reflectance of the obtained printed matter C in the wavelength range of 800 nm to 1300 nm was 25.3%.

Accordingly, the value obtained by dividing the average value of the diffuse reflectance of the printed matter C in the wavelength range of 800 nm to 1300 nm, by the average value of the diffuse reflectance of the blank printed matter of comparative example 3 in the wavelength range of 800 nm to 1300 was 0.33.

Comparative Example 3

In the same manner as in example 2 except that the varnish and the petroleum-based solvent, soybean oil, tung oil, compound, metal drier, and drying inhibitor were mixed in the formulation shown in table 2, an anti-counterfeit ink D (abbreviated as an ink D hereafter) for offset printing was obtained. White fine high quality paper was prepared as the base material to be printed and offset printing was performed using the ink D, to thereby obtain a printed matter D as a blank printed matter. The average value of the diffuse reflectance of the obtained printed matter D as a blank printed matter in the wavelength range of 800 nm to 1300 nm was 77.7%.

Comparative Example 4

20.0 mass % of antimony-doped tin oxide (ATO) fine particles (average particle size: 1 to 10 μm) as near infrared absorbing fine particles, 10.0 mass % of dispersant a, and 70.0 mass % of Exxsol D 80 (boiling point: 205° C., aniline point: 79° C.) as a solvent were weighed.

These near infrared absorbing fine particles, dispersing agent, and solvent were charged in a paint shaker containing 0.3 mmϕ ZrO$_2$ beads, pulverized and dispersed for 30 hours, to thereby obtain an infrared absorbing fine particle dispersion liquid of comparative example 4 (abbreviated as a dispersion liquid E hereafter).

When the dispersed particle size of each antimony-doped tin oxide fine particle in the dispersion liquid E was measured, it was found to be 64.5 nm.

In the same manner as in example 2 except that the dispersion liquid E, the varnish, the petroleum-based solvent, the soybean oil, the tung oil, the compound, the metal drier, and the drying inhibitor were mixed in the formulation shown in table 2, an anti-counterfeit ink E for offset printing (abbreviated as an ink E hereafter) was obtained. White fine high quality paper was prepared as the base material to be printed and offset printing was performed using the ink E, to thereby obtain a printed matter E. The average value of the reflectance of the obtained printed matter E in the wavelength range of 800 nm to 1300 nm was 68.5%.

Accordingly, the value obtained by dividing the average value of the diffuse reflectance of the printed matter E in the wavelength range of 800 nm to 1300 nm, by the average value of the diffuse reflectance of the blank of comparative example 3 in the wavelength range of 800 nm to 1300 nm was 0.88.

Evaluation of Examples 2 to 4 and Comparative Examples 3 and 4

In examples 2 to 4, printed matters A to C containing hexaboride fine particles in the printed pattern, show low diffuse reflectance in the wavelength range of 800 to 1300 nm. The value obtained by dividing the average value of the diffuse reflectance in the wavelength range of 800 nm to 1300 nm, by the average value of the diffuse reflectance of the blank in the wavelength range of 800 nm to 1300 nm is as small as 0.33 to 0.80. As a result, it was confirmed that the authenticity of the printed matter containing hexaboride particles was easily judged.

In contrast, the printed matter D not containing hexaboride fine particles in the printed pattern of comparative example 3 and the printed matter E containing antimony-doped tin oxide fine particles in the printed pattern of comparative example 4, show high diffuse reflectance of 69.5% to 77.7% in the wavelength range of 800 nm to 1300 nm. The value obtained by dividing the average value of the diffuse reflectance in the wavelength range of 800 nm to 1300 nm, by the average value of the diffuse reflectance of the blank in the wavelength range of 800 nm to 1300 nm is as large as 0.88 to 1.00, and judgment of authenticity is considered to be difficult by the reflectance in the wavelength range of 800 nm to 1300.

Further, in the case of obtaining the printed matter whose authenticity is easily judged by the printing ink containing antimony-doped tin oxide fine particles of comparative example 4, the thickness of the ink on the surface of the printed matter is required to be increased so that it can be visually recognized, and it is considered not practical to use such a printed matter for preventing counterfeiting.

TABLE 1

| | Raw material | | | | | Physical property | | | Optical property | | | | |
| | $LaB_6$ | Dispersant | | Solvent | | $LaB_6$ | | | Transmittance in each wavelength | | | | |
| | Content (Mass %) | Type | Acid value (mgKOH/g) | Content (Mass %) | Type | Content (Mass %) | A (nm) | B (nm) | C (%) | 550 nm (%) | 800 nm (%) | 900 nm (%) | 1000 nm (%) | 1500 nm (%) |
|---|---|---|---|---|---|---|---|---|---|---|---|---|---|---|
| Ex. 1 | 10 | a | 20.3 | 5.0 | Exol D80 | 85 | 79.3 | 0.4156 | 69.1 | 71.2 | 29.5 | 21.3 | 19.6 | 70.6 |
| Com. Ex. 1 | 10 | b | — | 8.0 | Toluene | 82 | 82.6 | 0.42 | — | — | — | — | — | — |
| Com. Ex. 2 | 10 | a | 20.3 | 8.0 | IPA | 82 | 80.1 | 0.42 | — | — | — | — | — | — |

Ex. = Example
Com. Ex. = Comparative Example
A = Dispersed particle size
B = Lattice constant
C = Transmittance of visible light
a: Dispersant having fatty acid in its structure, an amino group, an acid value of 20.3, a hydroxystearic acid chain, and a nonvolatile content of 100%.
b: Dispersant having fatty acid in its structure, an acid value of 5 mg KOH/g or more, and a nonvolatile content of 100%.

TABLE 2

| | Ex. 2 Ink A | Ex. 3 Ink B | Ex. 4 Ink C | Com. Ex. 3 Ink D | Com. Ex. 4 Ink E |
|---|---|---|---|---|---|
| Dispersion liquid A (mass %) | 3.8 | 7.5 | 18.8 | — | — |
| Dispersion liquid E (mass %) | — | — | — | — | 18.8 |
| Varnish (mass %) | 70.5 | 67.7 | 59.5 | 73.2 | 59.5 |
| Petroleum-based solvent (mass %) | 7.5 | 7.2 | 6.3 | 7.8 | 6.3 |
| Drying inhibitor (mass %) | 1.1 | 1.1 | 1.0 | 1.2 | 1.0 |
| Soybean oil (mass %) | 3.6 | 3.4 | 3.0 | 3.7 | 3.0 |
| Tung oil (mass %) | 3.6 | 3.4 | 3.0 | 3.7 | 3.0 |
| Compound (mass %) | 8.3 | 8.0 | 7.0 | 8.6 | 7.0 |
| Metal drier (mass %) | 1.8 | 1.7 | 1.5 | 1.8 | 1.5 |
| Sum (mass %) | 100 | 100 | 100 | 100 | 100 |
| $LaB_6$ concentration (mass %) | 0.38 | 0.75 | 1.88 | — | — |
| | Printed matter A | Printed matter B | Printed matter C | Printed matter D* | Printed matter E |
| Average diffuse reflectance (%) | 61.9 | 49.4 | 25.3 | 77.7* | 68.5 |
| Average diffuse reflectance (compared with blank) | 0.80 | 0.64 | 0.33 | 1.00* | 0.88 |

Printed matter D*: Blank printed matter
Ex. = Example
Com. Ex. = Comparative Example

The invention claimed is:
1. An anti-counterfeit ink composition for offset printing containing a near infrared absorbing fine particle dispersion liquid, wherein
the near infrared absorbing fine particle dispersion liquid contains:
a solvent of one or more kinds selected from petroleum-based solvents having an aromatic hydrocarbon content of 5% by weight or less and having an aniline point of from 75° C. or more and 95° C. or less and a boiling point of from 150° C. or more and 340° C. or less;
near infrared absorbing fine particles in an amount of 2 mass % or more and 25 mass % or less, selected from one or more kinds of hexaboride fine particles expressed by a general formula XBa (wherein element X is at least one or more kinds selected from a group consisting of La, Ce, Pr, Nd, Gd, Tb, Dy, Ho, Y, Sm, Eu, Er, Tm, Yb, Lu, Sr, and Ca, satisfying 4.0≤a≤6.2); and
a dispersant soluble in the solvent and having a fatty acid in its structure, and a viscosity of the near infrared absorbing fine particle dispersion liquid is 180 mPa·S or less.

2. The anti-counterfeit ink composition for offset printing according to claim 1, wherein the dispersant has one or more kinds of a functional group selected from the group consisting of a secondary amine group, a tertiary amine group, and a quaternary ammonium group.

3. The anti-counterfeit ink composition for offset printing according to claim 1, wherein the dispersant has an acid value of 1 mgKOH/g or more.

4. The anti-counterfeit ink composition for offset printing according to claim 1, wherein a dispersed particle size of each near infrared absorbing fine particle is 1 nm or more and 200 nm or less.

5. The anti-counterfeit ink composition for offset printing according to claim 1, wherein a surface of each near infrared absorbing fine particle is coated with a compound of one or more kinds selected from the group consisting of Si, Ti, Al, and Zr.

6. The anti-counterfeit ink composition for offset printing according to claim 1, wherein a lattice constant of the near infrared absorbing fine particle is 0.4100 nm or more and 0.4160 nm or less.

7. The anti-counterfeit ink composition for offset printing according to claim 1, wherein the near infrared absorbing fine particle dispersion liquid further contains a binder.

8. The anti-counterfeit ink composition for offset printing according to claim 1, wherein an addition amount of the dispersant is 30 parts by weight or more and 200 parts by weight or less based on 100 parts by weight of the hexaboride fine particles.

9. The anti-counterfeit ink composition for offset printing according to claim 1, further containing a resin varnish, wherein a content of the resin varnish is 15 to 70 mass %.

10. The anti-counterfeit ink composition for offset printing according to claim 1 further containing a pigment.

11. The anti-counterfeit ink composition for offset printing according to claim 10, wherein the pigment is an inorganic pigment and is one or more kinds selected from the group consisting of carbon black, white pigment, an extender pigment, a red pigment, a yellow pigment, a green pigment, a blue pigment, a purple pigment, a fluorescent pigment, a temperature indicating pigment, a pearl pigment, and a metal powder pigment.

12. The anti-counterfeit ink composition for offset printing according to claim 10, wherein the pigment is an organic pigment and is one or more kinds selected from the group consisting of an azo lake pigment, an insoluble azo pigment, a condensed azo pigment, a phthalocyanine pigment, and a condensed polycyclic pigment.

13. The anti-counterfeit ink composition for offset printing according to claim 1, containing one or more kinds selected from the group consisting of a plasticizer, an antioxidant, a thickener, and a wax.

14. An anti-counterfeit printed matter having a printed pattern on one side or both sides of a base material, wherein the printed pattern is formed by offset printing using the anti-counterfeit ink composition for offset printing of claim 1.

15. The anti-counterfeit printed matter according to claim 14, wherein the printed pattern further contains a pigment.

16. The anti-counterfeit printed matter according to claim 15, wherein the pigment is an inorganic pigment, and is one or more kinds selected from the group consisting of carbon black, white pigment, an extender pigment, a red pigment, a yellow pigment, a green pigment, a blue pigment, a purple pigment, a fluorescent pigment, a temperature indicating pigment, a pearl pigment, and a metal powder pigment.

17. The anti-counterfeit printed matter according to claim 15, wherein the pigment is an organic pigment and is one or more kinds selected from the group consisting of an azo lake pigment, an insoluble azo pigment, a condensed azo pigment, a phthalocyanine pigment, and a condensed polycyclic pigment.

18. The anti-counterfeit printed matter according to claim 14, wherein a value obtained by dividing an average value of a diffuse reflectance of the anti-counterfeit printed matter in a wavelength range of 800 nm to 1300 nm, by an average value of a diffuse reflectance of a blank not containing the near infrared absorbing fine particles in the wavelength range of 800 nm to 1300 nm, is 0.84 or less.

* * * * *